(12) United States Patent
Johnson et al.

(10) Patent No.: US 7,321,699 B2
(45) Date of Patent: Jan. 22, 2008

(54) SIGNAL INTENSITY RANGE TRANSFORMATION APPARATUS AND METHOD

(75) Inventors: Stephen G. Johnson, Little Compton, RI (US); Norbert W. Elsdoerfer, Warwick, RI (US); Charles M. Anastasia, Barrington, RI (US)

(73) Assignee: Rytec Corporation, Jackson, WI (US)

( * ) Notice: Subject to any disclaimer, the term of this patent is extended or adjusted under 35 U.S.C. 154(b) by 949 days.

(21) Appl. No.: 10/657,723

(22) Filed: Sep. 8, 2003

(65) Prior Publication Data

US 2004/0131273 A1 Jul. 8, 2004

Related U.S. Application Data

(60) Provisional application No. 60/408,663, filed on Sep. 6, 2002.

(51) Int. Cl.
G06K 9/40 (2006.01)
H04N 1/40 (2006.01)

(52) U.S. Cl. .................. 382/254; 382/168; 382/298; 358/447; 358/451

(58) Field of Classification Search ............ 382/168, 382/254, 260, 274, 275, 298; 358/1.2, 447, 358/451, 521; 348/254, 572, 575
See application file for complete search history.

(56) References Cited

U.S. PATENT DOCUMENTS

| | | |
|---|---|---|
| 2,758,676 A | 8/1956 | Nikazy |
| 3,195,126 A | 7/1965 | Barker |
| 3,255,434 A | 6/1966 | Schwarz |
| 3,534,499 A | 10/1970 | Chaffee |
| 3,562,423 A | 2/1971 | Murphy |
| 3,590,151 A | 6/1971 | Keith |
| 3,663,937 A | 5/1972 | Bolner |
| 3,668,625 A | 6/1972 | Wolf et al. |
| 3,685,012 A | 8/1972 | Case et al. |
| 3,686,434 A | 8/1972 | Lemelson |
| 3,691,302 A | 9/1972 | Gaebele et al. |
| 3,691,556 A | 9/1972 | Bloice |
| 3,740,466 A | 6/1973 | Marshall et al. |
| 3,796,208 A | 3/1974 | Bloice |
| 3,816,648 A | 6/1974 | Noll et al. |
| 3,852,592 A | 12/1974 | Scoville et al. |
| 3,890,463 A | 6/1975 | Ikegami et al. |
| 3,924,130 A | 12/1975 | Cohen et al. |
| 3,930,735 A | 1/1976 | Kerr |
| 3,947,833 A | 3/1976 | Eckstein, Jr. |
| 3,988,533 A | 10/1976 | Mick et al. |
| 4,044,860 A | 8/1977 | Kaneko et al. |
| 4,063,282 A | 12/1977 | Exton |
| 4,081,830 A | 3/1978 | Mick et al. |

(Continued)

OTHER PUBLICATIONS

Agrawal et al., entitled "Computer Analysis of Motion using a Network of Processors," pp. 305-308, published at Wayne State University in Detroilt Michigan in 1980.

(Continued)

*Primary Examiner*—Kanjibhai Patel
(74) *Attorney, Agent, or Firm*—Factor & Lake, Ltd.

(57) ABSTRACT

A system and method for manipulating image data is disclosed. Generally, the system and method identifies useful grey-levels within an input image. The image is then scaled based upon the identified useful grey-levels.

38 Claims, 5 Drawing Sheets

U.S. PATENT DOCUMENTS

| | | |
|---|---|---|
| 4,133,004 A | 1/1979 | Fitts |
| 4,136,950 A | 1/1979 | Labrum et al. |
| 4,148,062 A | 4/1979 | Kamin |
| 4,160,998 A | 7/1979 | Kamin |
| 4,163,357 A | 8/1979 | Grieve et al. |
| 4,163,991 A | 8/1979 | Burrig |
| 4,173,402 A | 11/1979 | Hosike et al. |
| 4,183,013 A | 1/1980 | Agrawala et al. |
| 4,185,298 A | 1/1980 | Billet et al. |
| 4,187,519 A | 2/1980 | Vitels et al. |
| 4,198,653 A | 4/1980 | Kamin |
| 4,214,265 A | 7/1980 | Olesen |
| 4,219,845 A | 8/1980 | Gibbons et al. |
| 4,219,847 A | 8/1980 | Pinkney et al. |
| 4,240,109 A | 12/1980 | Michael et al. |
| 4,245,243 A | 1/1981 | Gutjahr et al. |
| 4,249,207 A | 2/1981 | Hosman et al. |
| 4,249,212 A | 2/1981 | Ito et al. |
| 4,257,063 A | 3/1981 | Loughry et al. |
| 4,258,351 A | 3/1981 | Shigeta et al. |
| 4,298,858 A | 11/1981 | Romanski |
| 4,317,130 A | 2/1982 | Brown |
| 4,337,481 A | 6/1982 | Mick et al. |
| 4,364,113 A | 12/1982 | Sengebusch et al. |
| 4,395,699 A | 7/1983 | Sternberg |
| 4,408,224 A | 10/1983 | Yoshida |
| 4,410,910 A | 10/1983 | Andes |
| 4,414,685 A | 11/1983 | Sternberg |
| 4,433,325 A | 2/1984 | Tanaka et al. |
| 4,433,438 A | 2/1984 | Couturier |
| 4,435,835 A | 3/1984 | Sakow et al. |
| 4,449,144 A | 5/1984 | Suzuki |
| 4,450,482 A | 5/1984 | Ackerman |
| 4,455,550 A | 6/1984 | Iguchi |
| 4,458,266 A | 7/1984 | Mahoney |
| 4,479,145 A | 10/1984 | Azuma et al. |
| 4,490,851 A | 12/1984 | Gerhart et al. |
| 4,493,420 A | 1/1985 | Dennis |
| 4,506,765 A | 3/1985 | Payne et al. |
| 4,520,343 A | 5/1985 | Koh et al. |
| 4,520,504 A | 5/1985 | Walker et al. |
| 4,543,567 A | 9/1985 | Shiratan et al. |
| 4,554,459 A | 11/1985 | Tsutsumi et al. |
| 4,555,724 A | 11/1985 | Enriquez |
| 4,556,900 A | 12/1985 | Willis |
| 4,565,029 A | 1/1986 | Kornbrekke et al. |
| 4,569,078 A | 2/1986 | Zuk |
| 4,574,393 A | 3/1986 | Blackwell et al. |
| 4,577,344 A | 3/1986 | Warren et al. |
| 4,589,030 A | 5/1986 | Klay |
| 4,589,139 A | 5/1986 | Hada et al. |
| 4,626,891 A | 12/1986 | Achiha |
| 4,626,908 A | 12/1986 | Tani |
| 4,639,767 A | 1/1987 | Suzuki |
| 4,641,120 A | 2/1987 | Bonfig et al. |
| 4,641,356 A | 2/1987 | Sternberg |
| 4,653,109 A | 3/1987 | Lemelson et al. |
| 4,662,479 A | 5/1987 | Tsuji et al. |
| 4,665,554 A | 5/1987 | Sternberg |
| 4,669,218 A | 6/1987 | Kornbrekke et al. |
| 4,679,077 A | 7/1987 | Yuasa et al. |
| 4,680,704 A | 7/1987 | Konicek et al. |
| 4,685,145 A | 8/1987 | Schiller |
| 4,685,146 A | 8/1987 | Fenster et al. |
| 4,692,806 A | 9/1987 | Anderson et al. |
| 4,694,329 A | 9/1987 | Belmares-Sarabia et al. |
| 4,697,594 A * | 10/1987 | Mayo, Jr. .................. 600/443 |
| 4,698,937 A | 10/1987 | Kornbrekke et al. |
| 4,709,264 A | 11/1987 | Tamusa et al. |
| 4,736,252 A | 4/1988 | Nakagawa et al. |
| 4,737,847 A | 4/1988 | Araki et al. |
| 4,739,401 A | 4/1988 | Sacks et al. |
| 4,742,549 A | 5/1988 | Roschier |
| 4,760,607 A | 7/1988 | Sternberg et al. |
| 4,779,131 A | 10/1988 | Matsumoto et al. |
| 4,783,833 A | 11/1988 | Kowubata et al. |
| 4,794,248 A | 12/1988 | Gray |
| 4,799,243 A | 1/1989 | Zepke |
| 4,807,034 A | 2/1989 | Takeuchi et al. |
| 4,823,010 A | 4/1989 | Kornbrekke et al. |
| 4,825,393 A | 4/1989 | Nishiya |
| 4,831,641 A | 5/1989 | Niemi |
| 4,839,648 A | 6/1989 | Beucher et al. |
| 4,845,761 A | 7/1989 | Cate et al. |
| 4,847,772 A | 7/1989 | Michalopoulos et al. |
| 4,849,906 A | 7/1989 | Chodos et al. |
| 4,858,156 A | 8/1989 | Martin |
| 4,860,371 A | 8/1989 | Matsuyama et al. |
| 4,868,651 A | 9/1989 | Chou et al. |
| 4,871,948 A | 10/1989 | Nelson |
| 4,874,063 A | 10/1989 | Taylor |
| 4,876,728 A | 10/1989 | Roth |
| 4,881,270 A | 11/1989 | Knecht et al. |
| 4,884,136 A | 11/1989 | Ninomiya et al. |
| 4,906,940 A | 3/1990 | Greene et al. |
| 4,908,704 A | 3/1990 | Fujioka et al. |
| 4,920,572 A | 4/1990 | Sugita et al. |
| 4,924,310 A | 5/1990 | von Brandt |
| 4,924,416 A | 5/1990 | Sasao |
| 4,928,176 A | 5/1990 | Schmidt et al. |
| 4,931,864 A | 6/1990 | Kawamura et al. |
| 4,937,878 A | 6/1990 | Lo et al. |
| 4,947,353 A | 8/1990 | Quinlan, Jr. |
| 4,951,137 A | 8/1990 | Kisov et al. |
| 4,959,714 A | 9/1990 | Lo et al. |
| 4,962,419 A | 10/1990 | Hibbard et al. |
| 4,967,083 A | 10/1990 | Kornbrekke et al. |
| 4,969,202 A | 11/1990 | Groezinger |
| 4,974,077 A | 11/1990 | Kusaba |
| 4,975,970 A | 12/1990 | Zettel et al. |
| 4,975,973 A | 12/1990 | Kasane et al. |
| 4,979,136 A | 12/1990 | Weiman et al. |
| 4,984,071 A | 1/1991 | Yonezawa |
| 4,985,618 A | 1/1991 | Inada et al. |
| 4,987,602 A | 1/1991 | Brunner et al. |
| 4,991,092 A | 2/1991 | Greensite |
| 5,001,557 A | 3/1991 | Begle |
| 5,008,739 A | 4/1991 | D'Luua et al. |
| 5,010,578 A | 4/1991 | Siener et al. |
| 5,018,218 A | 5/1991 | Peregrim et al. |
| 5,022,062 A | 6/1991 | Annis |
| 5,023,809 A | 6/1991 | Spackman et al. |
| 5,031,227 A | 7/1991 | Raasch et al. |
| 5,032,905 A | 7/1991 | Koga |
| 5,034,986 A | 7/1991 | Karmann et al. |
| 5,047,851 A | 9/1991 | Sauerwein et al. |
| 5,052,045 A | 9/1991 | Peregrim et al. |
| 5,067,014 A | 11/1991 | Bergen et al. |
| 5,075,632 A | 12/1991 | Payne et al. |
| 5,091,967 A | 2/1992 | Ohsawa |
| 5,099,324 A | 3/1992 | Abe |
| 5,101,440 A | 3/1992 | Watanabe et al. |
| 5,103,305 A | 4/1992 | Watanabe |
| 5,115,477 A | 5/1992 | Groezinger |
| 5,119,442 A | 6/1992 | Brown |
| 5,121,201 A | 6/1992 | Seki |
| 5,134,472 A | 7/1992 | Abe |
| 5,134,661 A | 7/1992 | Reinsch |
| 5,140,649 A | 8/1992 | Kageyama |
| 5,142,152 A | 8/1992 | Boiucaner |
| 5,149,921 A | 9/1992 | Picado |
| 5,150,421 A | 9/1992 | Morishita et al. |
| 5,150,426 A | 9/1992 | Bauh et al. |
| 5,151,945 A | 9/1992 | Lee et al. |

| | | | | | | |
|---|---|---|---|---|---|---|
| 5,159,646 A | 10/1992 | Kumagai | | 5,631,984 A | 5/1997 | Graf et al. |
| 5,161,107 A | 11/1992 | Mayeaux et al. | | 5,640,468 A | 6/1997 | Hsu |
| 5,162,902 A | 11/1992 | Bell et al. | | 5,657,403 A | 8/1997 | Wolff et al. |
| 5,181,254 A | 1/1993 | Schweizer et al. | | 5,668,890 A | 9/1997 | Winkelman |
| 5,182,776 A | 1/1993 | Suzuki et al. | | 5,673,355 A | 9/1997 | Strolle et al. |
| 5,182,778 A | 1/1993 | Rudek et al. | | 5,675,624 A | 10/1997 | Relihan et al. |
| 5,187,747 A | 2/1993 | Capello et al. | | 5,682,438 A | 10/1997 | Kojima et al. |
| 5,212,740 A | 5/1993 | Pack et al. | | 5,684,898 A | 11/1997 | Brady et al. |
| 5,239,596 A | 8/1993 | Mahoney | | 5,687,249 A | 11/1997 | Kato |
| 5,241,608 A | 8/1993 | Fogel | | 5,687,251 A | 11/1997 | Erler et al. |
| 5,243,663 A | 9/1993 | Kudoh | | 5,701,163 A | 12/1997 | Richards et al. |
| 5,243,668 A | 9/1993 | Kitamura et al. | | 5,727,080 A | 3/1998 | Cox et al. |
| 5,247,366 A | 9/1993 | Ginosar et al. | | 5,734,746 A | 3/1998 | Jaspers |
| 5,249,241 A | 9/1993 | Silverman et al. | | 5,740,801 A | 4/1998 | Branson |
| 5,257,209 A | 10/1993 | Maskandey | | 5,748,773 A | 5/1998 | Tashiro et al. |
| 5,258,586 A | 11/1993 | Suzuki et al. | | 5,748,802 A | 5/1998 | Winkelman |
| 5,263,098 A | 11/1993 | Hovikami | | 5,756,981 A | 5/1998 | Roustaei et al. |
| 5,271,064 A | 12/1993 | Dhawan et al. | | 5,757,286 A | 5/1998 | Jonsson et al. |
| 5,281,964 A | 1/1994 | Iida et al. | | 5,761,326 A | 6/1998 | Brady et al. |
| 5,282,337 A | 2/1994 | Duhame et al. | | 5,771,485 A | 6/1998 | Echigo |
| 5,283,573 A | 2/1994 | Takatov et al. | | 5,774,569 A | 6/1998 | Waldenmaier |
| 5,289,520 A | 2/1994 | Pellegrino et al. | | 5,799,100 A | 8/1998 | Clarke et al. |
| 5,291,313 A | 3/1994 | Kim | | 5,799,106 A | 8/1998 | Mooney et al. |
| 5,294,986 A | 3/1994 | Tsuji et al. | | 5,802,208 A | 9/1998 | Podilchuk et al. |
| 5,296,852 A | 3/1994 | Rathi | | 5,808,697 A | 9/1998 | Fujimura et al. |
| 5,298,697 A | 3/1994 | Suzuki et al. | | 5,809,162 A | 9/1998 | Csipkes et al. |
| 5,300,739 A | 4/1994 | Bittner | | 5,822,453 A | 10/1998 | Lee et al. |
| 5,305,395 A | 4/1994 | Mahoney et al. | | 5,825,922 A | 10/1998 | Pearson et al. |
| 5,311,598 A | 5/1994 | Bose et al. | | 5,832,111 A | 11/1998 | Florent |
| 5,313,295 A | 5/1994 | Taniguchi et al. | | 5,832,118 A | 11/1998 | Kim |
| 5,315,389 A | 5/1994 | Izawa et al. | | 5,832,139 A | 11/1998 | Battesman et al. |
| 5,319,547 A | 6/1994 | Krug et al. | | 5,835,613 A | 11/1998 | Breed et al. |
| 5,353,021 A | 10/1994 | Toyamas | | 5,835,618 A | 11/1998 | Fang et al. |
| 5,359,674 A | 10/1994 | van der Wal | | 5,835,638 A | 11/1998 | Rucklidge et al. |
| 5,376,962 A | 12/1994 | Zorten | | 5,838,299 A | 11/1998 | Smith et al. |
| 5,387,768 A | 2/1995 | Izard et al. | | 5,838,758 A | 11/1998 | Krug et al. |
| 5,387,930 A | 2/1995 | Toh | | 5,844,565 A | 12/1998 | Mizutani et al. |
| 5,402,118 A | 3/1995 | Aoki | | 5,845,000 A | 12/1998 | Breed et al. |
| 5,406,501 A | 4/1995 | Florent | | 5,845,007 A | 12/1998 | Ohashi et al. |
| 5,410,418 A | 4/1995 | Yonezawa | | 5,847,755 A | 12/1998 | Wixson et al. |
| 5,420,971 A | 5/1995 | Westerink et al. | | 5,848,179 A | 12/1998 | Braet |
| 5,426,517 A | 6/1995 | Schwartz | | 5,848,190 A | 12/1998 | Kleehamer et al. |
| 5,426,685 A | 6/1995 | Pellegrino et al. | | 5,854,851 A | 12/1998 | Bamberger et al. |
| 5,432,528 A | 7/1995 | Ritter | | 5,857,029 A | 1/1999 | Patel |
| 5,436,984 A | 7/1995 | Sarkkinen et al. | | 5,859,698 A | 1/1999 | Chou et al. |
| 5,438,360 A | 8/1995 | Edwards | | 5,862,254 A | 1/1999 | Kim et al. |
| 5,450,502 A | 9/1995 | Eschbach et al. | | 5,872,857 A | 2/1999 | Chudos et al. |
| 5,483,351 A | 1/1996 | Mailloux et al. | | 5,875,264 A | 2/1999 | Carlstrom |
| 5,490,218 A | 2/1996 | Krug et al. | | 5,877,819 A | 3/1999 | Branson |
| 5,500,904 A | 3/1996 | Markaudey et al. | | 5,883,969 A | 3/1999 | Le Gouzouguec et al. |
| 5,509,082 A | 4/1996 | Toyama et al. | | 5,890,808 A | 4/1999 | Neff et al. |
| 5,511,133 A | 4/1996 | Shimizu et al. | | 5,892,917 A | 4/1999 | Myerson |
| 5,519,784 A | 5/1996 | Velmeulen et al. | | 5,901,241 A | 5/1999 | Koljonen et al. |
| 5,528,703 A | 6/1996 | Lee | | 5,907,643 A | 5/1999 | Adach |
| 5,537,224 A | 7/1996 | Suzuki et al. | | 5,937,090 A | 8/1999 | Kim |
| 5,544,258 A | 8/1996 | Levien | | 5,946,404 A | 8/1999 | Badsh et al. |
| 5,551,533 A | 9/1996 | Ng | | 5,946,407 A | 8/1999 | Bamberger et al. |
| 5,555,318 A | 9/1996 | Ito et al. | | 5,949,918 A | 9/1999 | McCaffrey |
| 5,572,595 A | 11/1996 | Kumagai et al. | | 5,956,435 A | 9/1999 | Buzug et al. |
| 5,581,370 A | 12/1996 | Fuss et al. | | 5,963,276 A | 10/1999 | Inbar |
| 5,581,625 A | 12/1996 | Connell | | 5,970,164 A | 10/1999 | Bamberger et al. |
| 5,590,217 A | 12/1996 | Toyama | | 5,974,169 A | 10/1999 | Bachelder |
| 5,592,567 A | 1/1997 | Kilger | | 5,978,502 A | 11/1999 | Ohash |
| 5,596,418 A | 1/1997 | Strolle et al. | | 5,978,506 A * | 11/1999 | Murayama et al. ......... 382/162 |
| 5,598,338 A | 1/1997 | Tanigrchi et al. | | 5,978,507 A | 11/1999 | Shackleton et al. |
| 5,604,822 A | 2/1997 | Pearson et al. | | 5,982,424 A | 11/1999 | Simerly et al. |
| 5,606,432 A | 2/1997 | Ohtsuka et al. | | 5,982,917 A | 11/1999 | Clarke et al. |
| 5,609,152 A | 3/1997 | Pellegrino et al. | | 5,982,926 A * | 11/1999 | Kuo et al. ................. 382/167 |
| 5,612,928 A | 3/1997 | Haley et al. | | 5,999,660 A | 12/1999 | Zorin et al. |
| 5,617,484 A | 4/1997 | Wada et al. | | 6,002,525 A | 12/1999 | Poulo et al. |
| 5,621,868 A | 4/1997 | Mizutani et al. | | 6,002,782 A | 12/1999 | Dionysinu |
| 5,625,709 A | 4/1997 | Kasdon | | 6,020,931 A | 2/2000 | Bilbrey et al. |
| 5,631,975 A | 5/1997 | Riglet et al. | | 6,041,138 A | 3/2000 | Nishida |

| | | |
|---|---|---|
| 6,055,334 A | 4/2000 | Kato |
| 6,067,366 A | 5/2000 | Simanovsky et al. |
| 6,069,971 A | 5/2000 | Kanno et al. |
| 6,075,871 A | 6/2000 | Simanovsky et al. |
| 6,075,890 A | 6/2000 | Park |
| 6,081,618 A | 6/2000 | Naoi et al. |
| 6,088,468 A | 7/2000 | Ito et al. |
| 6,101,294 A | 8/2000 | McCaffrey et al. |
| 6,104,763 A | 8/2000 | Limberg |
| 6,111,607 A | 8/2000 | Kampyama |
| 6,111,974 A | 8/2000 | Hiraoglu et al. |
| 6,111,980 A | 8/2000 | Sano et al. |
| 6,118,892 A | 9/2000 | Williams |
| 6,134,339 A | 10/2000 | Luo |
| 6,134,373 A | 10/2000 | Strolle et al. |
| 6,137,893 A | 10/2000 | Michael et al. |
| 6,148,103 A | 11/2000 | Nenonen |
| 6,154,560 A | 11/2000 | Cothren et al. |
| 6,157,373 A | 12/2000 | Rago |
| 6,163,621 A | 12/2000 | Paik et al. |
| 6,201,616 B1 | 3/2001 | Sasanuma et al. |
| 6,219,447 B1 | 4/2001 | Lee |
| 6,246,450 B1 | 6/2001 | Inbar |
| 6,246,827 B1 | 6/2001 | Strolle et al. |
| 6,255,650 B1 | 7/2001 | Warner et al. |
| 6,259,472 B1 | 7/2001 | Park |
| 6,266,102 B1 | 7/2001 | Azuma et al. |
| 6,272,246 B1 | 8/2001 | Taka |
| 6,320,981 B1 | 11/2001 | Yada |
| 6,373,533 B1 | 4/2002 | Kawabata et al. |
| 6,392,764 B1 | 5/2002 | Eschbach et al. |
| 6,393,148 B1 | 5/2002 | Bhaskar |
| 6,415,049 B1 | 7/2002 | Yanagita et al. |
| 6,421,097 B1 | 7/2002 | O'Rourke |
| 6,665,435 B1 * | 12/2003 | Caldato et al. ............. 382/166 |
| 6,760,086 B2 * | 7/2004 | Yanagisawa et al. ....... 349/122 |
| 7,006,688 B2 * | 2/2006 | Zaklika et al. .............. 382/165 |

OTHER PUBLICATIONS

Goujou et al., entitled "Human Detection with a Video Surveillance System," pp. 1179-1184, published on Jun. 11, 1995, under Publication No. XP 000559355.

* cited by examiner $a = 9, 10, 12,$ or $16$

SIGNAL INTENSITY RANGE TRANSFORMATION APPARATUS AND METHOD

RELATED APPLICATIONS

This application claims the benefit of U.S. Provisional Application No. 60/408,663, filed Sep. 6, 2002, and herein incorporated by reference.

TECHNICAL FIELD

The present invention generally relates to imaging systems, and in particular, to a system for manipulating image data.

BACKGROUND OF THE INVENTION

Human interpretation of video or other imagery can be made difficult or even impossible by system noise, image blur, and poor contrast. These limitations are observed, for example, in most video and closed circuit television systems, and others, including such technology as RS-170 monochrome video, NTSC/PAL/SECAM video or digital color video formats.

Extreme lighting variation, for example, due to sunlight beams, can cause typical video cameras and imaging sensors to saturate (i.e., become unable to represent the real-world luminance range) resulting in wide-scale bright and dark regions having extremely low-contrast wherein objects are difficult or impossible to discern. At outdoor automated teller machines, for example, sunlight beams or strong lighting, in the background can cause a person in a dark area to become unidentifiable due to low contrast. This weakness is due to the limited luminance range of the imaging system.

The electronic iris and automatic gain control provided by some imaging systems are designed to try to optimally map the wide luminance values within a real-world light situation into a limited range digital representation, often resulting in a poor compromise. To adequately represent the bright areas, less illuminated areas become dramatically compressed in contrast and thus become very dark.

Besides having limited range, video or imagery from lower-cost imaging sensors can have significant noise due to a number of basic system limitations, as well as significant blur due to lower-cost, small, or simple optical configurations. Reducing noise and blur within these systems can improve the ability for a human viewer to effectively interpret image content.

Moreover, digital samples of interlaced analog video from a video field are typically taken by imaging systems. The noise inherent in such digital samples can make human interpretation of important details in the image difficult.

Hence, a need exists for a luminance range transformation apparatus and method that manipulates image data for improved interpretation thereof.

Others have provided some image post processing devices which can enhance contrast of an image. However, in many areas such as in security monitoring, real-time evaluation of images is highly beneficial or necessary. Accordingly, there is also a need to provide a luminance range transformation apparatus which can enhance an image in real-time or near-real time.

SUMMARY OF THE INVENTION

According to the present invention, a system and method has been developed that considers the mechanisms and defects of imagery from video or other sources to prescribe a sequence of tailored image processing operations designed to improve human interpretation of resulting images.

However, in a broad aspect of the invention, methods and devices are provided to redistribute discrete signal intensity values within groups of signal intensity values. The signal intensity values are supplied directly or indirectly from a sensor sensing an environment. It is proposed that the inventions can be used for enhanced interpretation of any array of signal intensities or variable values in any group of such values that have spatial or geometric relationships to one another (e.g. coordinates).

For example, the detailed disclosures below are directed to redistribution of grey-scale or luminance values in a rectilinear array (pixels) from a camera. It is also contemplated however, that the inventions may be applied to other values in a video image, such as redistribution of chrominance values. It is also proposed that the inventions may be employed with other sensing modalities such as, magnetic resonance imagery, radar, sonar, infrared, ultraviolet, microwave, X-ray, radio wave, and the like.

According to another aspect of the invention, the spatial scale of an entire group of signal intensity values are considered, for example, the luminance in an entire pixel image, so that the overall brightness from corner to corner is taken into account. In an orthogonal direction, all the frequency content of an image must be represented by the one global mapping, including the very lowest spatial frequency. Often, this single global mapping has to stretch to map all of the low frequency variation in the image, and then fails to enhance higher frequency structure of interest. The result can be a bright "bloom" on one side of the image, with too dark an area on the other side of the image. As such, there may not be optimal recognition of spatial structure because of the need to represent the large scale variation across the entire image.

It is proposed that to further improve overall contrast balance to reveal image structure at scales of interest by applying equalization at spatial scales representative of scales of interest. Accordingly, the inventions propose generating subset partitions of an image (group of signal intensities) representative of the spatial scales of interest. A transform mapping (e.g. of luminance) for the subsets of signal values is generated, so that a spatial scale (e.g., is ¼ of a global image for a quadrant subset) so as to mitigate or eliminate the lowest frequency from consideration. This improves representation of contrast for structures at this scale.

Computing a luminance transformation at every pixel (with for example a filter kernel) for a neighborhood around that pixel, would result in a large computational burden because the resulting spatial scales are too small. In contrast, the present invention employs accumulating pixel samples across larger "right-sized" spatial scales, while using efficient interpolation to produce the correct transform (e.g. for luminance) representation at each pixel.

According to another aspect of the invention, apparatus and methods include: decomposing a group of signal values into subgroup partitions from which to sample values and construct associated transforms and to combine those transform values at every coordinate (e.g. pixel) according to a rule which weights the contribution of each mapping in accordance with "image" geometry and value coordinate or position.

According to another aspect of the invention, apparatus and methods are provided for blending transformed values from the global set of values (e.g. entire pixel image) with transformed values from the spatial segments to adjust contributions from several spatial scales as desired.

While overall interpretation of groups of signal intensity values is provided according to the invention, it is of particular note that the effectively mitigate signal values which are out of limit for a sensor system, for example, saturated sensor response.

In a preferred embodiment for enhancing luminance contrast in video signals, preferred operations can include digital sampling and luminance/color separation, noise reduction, deblurring, pixel noise reduction, histogram smoothing, contrast stretching, and luminance and chrominance re-combination. One or more of the operators can have configurable attributes, such as degree of noise reduction, brightness, degree of deblurring, and determined range of useful grey-levels.

Other advantages and features of the present invention will be apparent from the following description of a specific embodiment illustrated in the accompanying drawings.

DETAILED DESCRIPTION

Figure 1:
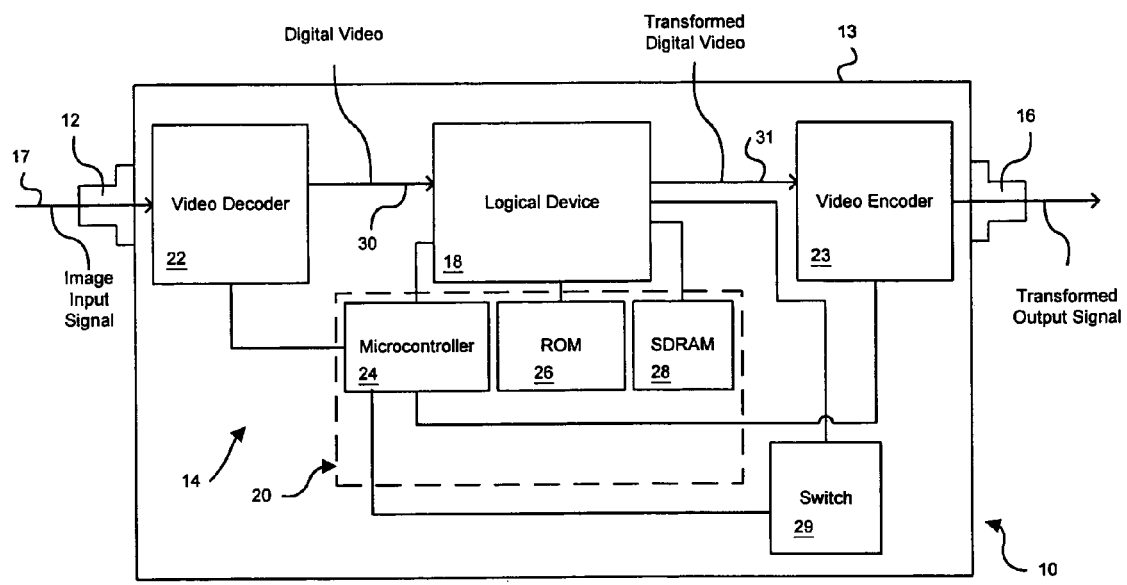
FIG. 1 is a simplified block diagram of a device in accordance with the present invention, including a logical device.

This invention is susceptible of embodiments in many different forms. For example, the methods and apparatus disclosed there is shown in the drawings and will herein be described in detail, a preferred embodiment of the invention. The present disclosure is to be considered as an exemplification of the principles of the invention and is not intended to limit the broad aspect of the invention to the embodiment illustrated.

Referring now to the drawings, and as will be appreciated by those having skill in the art, each of the FIGURES depicts a simplified block diagram wherein each block provides hardware (i.e., circuitry), firmware, software, or any combination thereof that performs one or more operations. Each block can be self-contained or integral with other hardware, firmware, or software associated with one or more other blocks.

Turning particularly to FIG. 1, a device 10 is disclosed for enhancing, through transformation, the luminance range of an image input signal. The device 10 includes an input connector 12, logic circuitry 14, and an output connector 16. The connectors 12 and 16 are mounted in a conventional manner to an enclosed housing 13, constructed of a metal, metal alloy, rigid plastic, or combinations of the above, that contains the logic circuitry 14. In one embodiment, one or more of the modules described herein are performed by the logic circuitry 14 comprising of one or more integrated circuits, commonly referred to as "ICs," placed on one or more printed circuit boards mounted within the housing 13.

Preferably, the device 10 is a stand-alone or embedded system. As used herein, the term "stand-alone" refers to a device that is self-contained, one that does not require any other devices to perform its primary functions. For example, a fax machine is a stand-alone device because it does not require a computer, printer, modem, or other device. Accordingly, in an embodiment, the device 10 does not need to provide ports for connecting a disk drive, display screen, or a keyboard. However, in an alternative embodiment, the device 10 could provide one or more ports (e.g., RS-232) for supporting field interactivity.

Also, as used herein, an embedded system is a system that is not a desktop computer or a workstation computer or a mainframe computer designed to admit facile human interactivity. Another delineator between embedded and "desktop" systems is that desktop systems (and workstation, etc.) present the status of the computer state to the human operator via a display screen and the internal state of the computer is represented by icons on the screen, and thus the person can interact with the computer internal state via control of the icons. Moreover, such a computer uses a software layer called an "operating system" through which the human operator can interact with the internal state of the computer. Conversely, with an embedded system, while it is performing its work function, the human operator cannot interact with the work process except to stop it.

The input connector 12 provides for operably connecting the device 10 to an image input signal 17 generated by a video camera (not shown), or the like, having a video output. In one embodiment, the input connector 12 consists of an F connector, BNC connector, RCA jacks, or the like. The input connector 12 is operably connected to the logic circuitry 14 by way of a conductive path attached to the input connector and the printed circuit board contained within the housing 13. The logic circuitry could also be coupled through other than a conductive path such as through optical coupling.

Preferably, but not necessarily, the image input signal 17 is a conventional analog video signal containing a plurality of still images or fixed image frames taken in a sequential manner. Each frame provided by the image input signal is also referred to herein as an image input frame. Each image or frame includes data regarding an array of pixels contained therein.

The output connector 16 of the device 10 provides for connecting the device to an output device such as a monitor (not shown). Like the input connector 12, the output connector 16 consists of any means for outputting the signal to other devices such as, an F connector, BNC connector, RCA jacks, or the like. The output connector 16 is operably connected to the logic circuitry 14 by way of a conductive or coupled path attached to the output connector and the printed circuit board contained within the housing 13. As explained in detail further herein, the output signal provided by connector 16, and thus the device 10, provides an output signal which includes data resulting from transforming or other operations carried out with respect to image input signal 17 received ("transformed output signal"). The output signal can include a plurality of image output frames and be formatted as a conventional analog video signal, a digital signal, or the like. For example, but by no means exclusive, the output signal can be in a format as defined by NTSC, VGA, HDTV, or other desired output formats.

In one embodiment, the logic circuitry 14 within the device 10 includes, inter alia, circuitry configured to transform the variable range of grey-scale values in the image input signal 17 received by the input connector 12. Preferably, the logic circuitry 14 includes a logical device 18 with corresponding support circuitry 20, a video decoder 22, and a video encoder 23. The support circuitry 20 preferably includes a microcontroller 24, a read only memory 26, and a random access memory 28 comprising a synchronous dynamic random access memory.

In an embodiment, an optional switch 29 is provided for configuring the logic circuitry 14 within the device 10. The switch 29 is operably connected to the microcontroller 24 and logical device 18. The switch 29 allows a user to enable or disable, features or processes provided by the logic circuitry 14 within the device 10. In one embodiment, the switch 29 consists of a conventional DIP switch. In an alternative embodiment, the configuration of the circuitry 14 within the device 10 is hardwired, or can be set via software commands, instead of using a switch.

Preferably, video decoder 22 is operably connected to the input connector 12 and the logical device 18. Accordingly, the video decoder 22 receives the image input signal 17 that can consist of live video from a television broadcast, a video tape, a camera, or any other desired signals containing or representing image content. The video decoder 22 preferably is a conventional device for tracking the video image input signal 17, digitizing the input signal (if required), separating out the brightness and color information from the input signal, and forwarding the digital video signal 30 to the logical device 18 on a frame by frame basis.

In one embodiment, the input image signal 17 received by the video decoder 22 is an analog signal formatted in a predefined manner such as PAL, NTSC, or another conventional format. The video decoder 22 converts the analog signal 17 into a digital video signal 30 using a conventional analog-to-digital conversion algorithm. Preferably, the digital video signal 30 provided by the video decoder 22 includes luminance information and color information in any conventional manner such as, specified by YUV format, YCbCr format, super video, S-video, or the like. Alternatively, the digital video signal 30 can have the luminance information embedded therein such as that provided by digital RGB, for example.

In one embodiment, the video decoder 22 is capable of converting a plurality of different analog video formats into digital video signals suitable for processing by the logical device 18 as described in detail further herein. In one embodiment, the microcontroller 24 configures the video decoder 22 for converting the image input signal 17 into a digital video signal 30 having a specific format type (e.g., CCIR601, RGB, etc.). If desired, the microcontroller 24 determines the format of the image input signal 17, and configures the video decoder 22 accordingly. The determination can be accomplished by the microcontroller 24 checking the user or device manufacturer configured settings of the DIP switch corresponding with the format of the image input signal 17 expected to be received. Alternatively, the video decoder 22 can include circuitry for automatically detecting the format of the image input signal 17, instead of using preset DIP switch settings.

Preferably, the gain of the video decoder 22 is set to reduce overall contrast on the luminance for reducing the probability of image saturation. In an alternative embodiment, the video decoder 22 provides a fixed bit resolution output range (e.g., 8 bit, 16 bit, 32 bit, etc.) and a digitizer maps the image input signal in a conventional manner for effective use of the resolution output range. Preferably, the full range of the digitizer output is utilized.

Turning to the logical device 18, as will be understood by those having skill in the art, the logical device receives digital video signals 30 and provides digital output signals 31 (i.e., transformed pixel array or frame data) in response to the digital video signals 30. As indicated previously, in one embodiment, the device 10 receives analog image input signals 17 that are converted by the video decoder 22 into digital video signals 30 for manipulation by the logical device 18. Moreover, as explained in detail further herein, the digital output 31 of the logical device 18 can be converted (if desired) into an analog output by the video encoder 23 connected between the logical device 18 and the output connector 16.

Preferably, the logical device 18 consists of a conventional field programmable gate array (FPGA). However, the logical device 18 can consists of a Digital Signal Processor (DSP), a microcontroller, an Application Specific Integrated Circuit (ASIC), or other suitable device.

In an alternative embodiment, instead of receiving analog input signals 17, the device 10 can receive digital image input signals that are provided, without any conversion, to the logical device 18. Thus, in this alternative embodiment, the video decoder 22 can be omitted.

Regardless of whether a video encoder or decoder is provided, it is to be understood that the logical device 18 is operably connected between connectors 12 and 16. Accordingly, an image input signal enters the input connector 12, is modified by the logical device 18, and then exits via the output connector 16 as a transformed output signal. Preferably, the frame output rate of the device 10 is substantially equal to the frame input rate to the device. The device 10 provides an output of thirty frames per second in response to a frame input rate of thirty frames per second.

Figure 2:
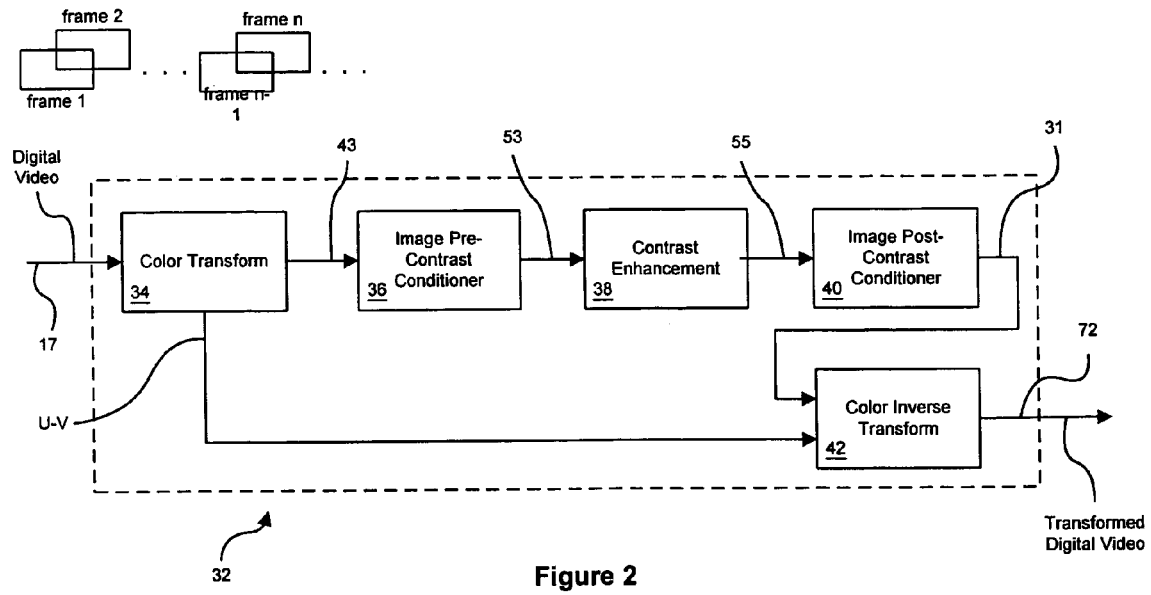
FIG. 2 is a simplified functional block diagram of a process performed by the logical device of FIG. 1, the process having a color transform, an image pre-contrast conditioner, a contrast enhancement, an image post-contrast conditioner, and a color inverse transform.

In one embodiment, the logical device 18 provides a sequence of image processing functional modules or blocks 32 within a process as illustrated in FIG. 2. In one embodiment, the blocks 32 represent a color transform 34, an image pre-contrast conditioner 36, a contrast enhancement 38, an image post-contrast conditioner 40, and a color inverse transform 42.

Each of the modules 32 preferably performs a specific functional step or plurality of functional steps as described in detail further herein. Turning back to FIG. 1, static data for configuring the logical device 18, if needed or desired, is stored within the read only memory 26 operably connected thereto. As appreciated by those having skill in the art, the read only memory 26 provides for storing data that is not alterable by computer instructions.

Storage for data manipulation and the like is provided by the synchronous dynamic random access memory (SDRAM) 28. Preferably, a high speed random access memory is provided by the support circuitry 20 to reduce performance bottlenecks. In one embodiment, the memory 20 is used as a field buffer.

Turning back to FIG. 2, the color transform 34 provides for separating the luminance from the digital video signal 30, as desired. In one embodiment, the digital video signal 30 provided by the video decoder 22 consists of a digital RGB signal. As such, luminance information is not separated from color information. Thus, the color transform 34 provides for separating the luminance information for each pixel, within each frame, from the digital video signal 30.

Preferably, the color transform 34 uses a conventional algorithm for converting a digital RGB video input signal into a Yuv format signal, YCbCr format signal, or other desired format signal. Accordingly, the color transform 34 provides an output comprising three channels: luminance 43, and U-V or other values ascribed per pixel location.

In an alternative embodiment, the digital video signal 30 provided by the video decoder 22 consists of a super video or S-video. As such, the digital video signal 30 consists of two different signals: chrominance and luminance. Accordingly, the color transform 34 can be omitted from the process of FIG. 2 because the luminance 43 is separately provided by the S-video input.

It should be understood as noted above, that a separate channel or channels (not shown) comprising the steps to be discussed below with respect to luminance information, could be provided to any one of RGB/chrominance values independently for transforming the values and redistributing the color values in the image.

Figure 3:
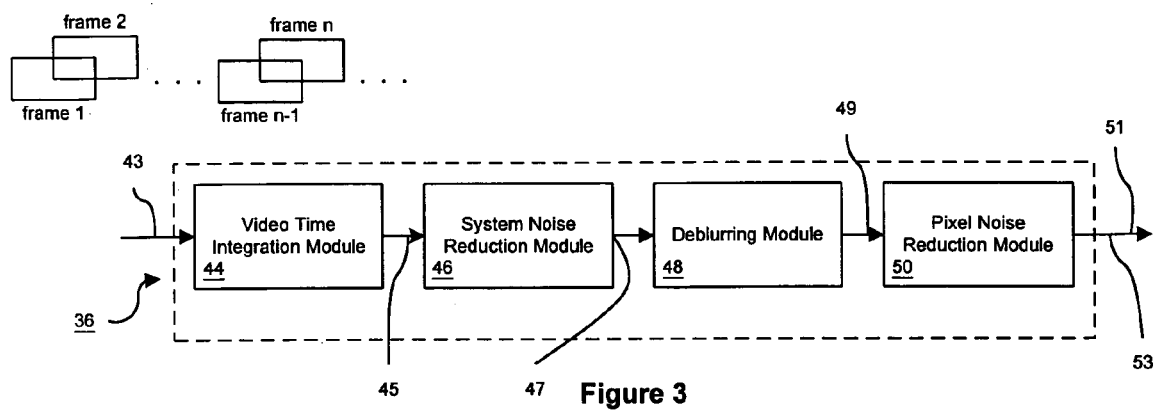
FIG. 3 is a simplified functional block diagram of the image pre-contrast conditioner of FIG. 2, the pre-contrast conditioner comprising a system noise reduction filter, a deblurring module, and a pixel noise reduction module.

As shown in FIG. 2, the luminance information 43 contained within the digital video signal 30 is received by the image pre-contrast conditioner 36. As shown in FIG. 3, the image pre-contrast conditioner 36 can include a video time integration module or block 44, a system noise reduction module or block 46, a deblurring module or block 48, and a pixel noise reduction module or block 50. As will be appreciated by those having ordinary skill in the art, any one or all of the blocks within FIG. 3 can be omitted including, but not limited to, the video time integration module 44.

In one embodiment, the video time integration module 44 consists of a low-pass filter for noise reduction of the luminance signal 43. As understood by those with skill in the art, each frame includes an array of pixels wherein each pixel has a specific i,j coordinate or address. Noise reduction by the video time integration module 44 is preferably achieved by combining the current frame (n) with the immediately preceding frame (n-1) stored by the logical device 18 within the memory 28. Desirably, for each pixel c(i,j) in the current image frame (n), the corresponding pixel p(i,j) from the preceding captured frame (n-1) is subtracted to result in a difference d(i,j). The absolute value of the difference d(i,j) is determined, and compared to a predetermined threshold value. If the absolute value of the difference d(i,j) is greater than the predetermined threshold, then the time integration output signal 45 of the video time integration module 44 is c(i,j). Otherwise, the time integration output signal 45 of the video time integration module 44 is the average of c(i,j) and p(i,j).

As indicated above, the video time integration module 44 can operate such that object motion, which ordinarily creates large pixel differences, are represented by current pixels while background differences due to noise are suppressed by the averaging. Accordingly, the video time integration module 44 provides for avoiding image blurring as a result of low-pass spatial domain filtering on the current image.

Figure 4A:
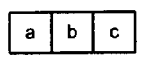
FIGS. 4(*a*)-(*f*) depict various exemplary kernels shapes that can be used with the system noise reduction filter, deblurring module, and pixel noise reduction module of FIG. 3.
Figure 4B:
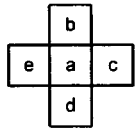
Figure 4C:
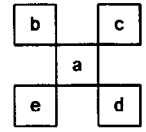

In one embodiment, the median filter or system noise reduction module 46 receives the time integration output signal 45 (i.e., transformed pixel frame data) and, in response thereto, provides for reducing pixel noise caused by the system senor (e.g., camera), electromagnetic, and/or thermal noise. The median filter 46 can include a user selectable level of noise reduction by selecting from a plurality of filter kernels via DIP switch 29, or the like, operably coupled to the logical device 18. The filter kernel applied by the noise reduction module 40 to the current frame, as preferably modified by time integration module 44, is designed to achieve noise reduction while minimizing the adverse effect of the filter on perceived image quality. For instance, a 3×1 kernel (FIG. 4(a)) provides for a reduction in row noise due to the kernel shape, while having minimal adverse effect on the image. Also, a 5-point or plus kernel (FIG. 4(b)) offers symmetric noise reduction with low adverse impact to image quality. Moreover, a hybrid median filter (FIG. 4(c)) offers symmetric noise reduction with lower adverse impact than the full 3×3 kernel. In one embodiment, a user or the manufacturer can select from the kernel shapes shown in FIGS. 4(a)-(c).

The deblurring module or block 48 provides for counteracting image blurring attributable to the point spread function of the imaging system (not shown). In an embodiment, the deblurring module or block 48 uses a Laplacian filter to sharpen the output 47 (i.e., transformed pixel frame data) received from the filter 46. The deblurring module or block 48 can include a user-selectable level of image sharpening from a plurality of Laplacian filter center pixel weights. In one embodiment, the user or manufacturer can select the center pixel weight via the DIP switch 29 operably coupled to the logical device 18.

Figure 4D:
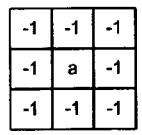

Preferably, the Laplacian filter uses a 3×3 kernel (FIG. 4(d)) with selectable center pixel weights of 9, 10, 12, or 16, requiring normalization divisors of 1, 2, 4, or 8, respectively. As shown in FIG. 4(d), the remaining kernel pixels are preferably assigned a weight of −1. The result of applying the kernel is normalized by dividing the convolution result for the current pixel element by the normalization divisor.

Figure 4E:
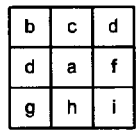
Figure 4F:
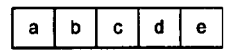

As will be appreciated by those having ordinary skill in the art, the deblurring module or block 48 can use other filters in place of a Laplacian type filter. In an embodiment, and in like fashion to the use of the Laplacian filter with various weights, a general filter with kernel as shown in FIG. 4(e) can be used for deblurring.

The output 49 (i.e., transformed pixel frame data) of the deblurring module 48 emphasizes isolated pixel noise present in the input image signal. Preferably, the pixel noise reduction module 50 provides for reducing isolated pixel noise emphasized within the output 49 of the deblurring module 48. In one embodiment, the pixel noise reduction module 50 employs a small-kernel median filter (i.e., small pixel neighborhood such as a 3×3) to reduce isolated pixel noise. The pixel noise reduction filter or module 50 can provide a user or manufacturer selectable level of noise reduction by allowing for the selection from a plurality of filter kernels. In a preferred embodiment, the DIP switch 29, software, or the like, is used to select from a five-point "plus patterned" kernel (FIG. 4(b)) or a hybrid median filter such as (FIG. 4(c)).

As shown in FIG. 2, the contrast enhancement module or block 38 enhances the contrast of the conditioned luminance signal 53 (i.e., transformed pixel frame data) provided by the image pre-contrast conditioner 36 in response to the original luminance input signal 17. In an alternative embodiment, no image pre-contrast is provided. Instead, the contrast enhancement module 38 directly receives the image input signal 17, and in response thereto, generates an enhanced image signal 55.

Figure 5:
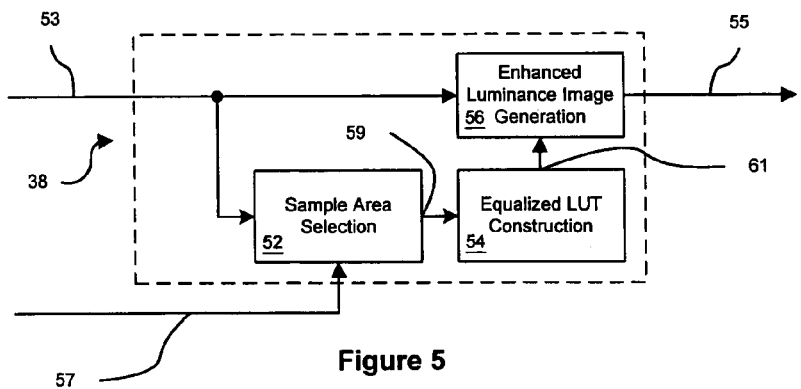
FIG. 5 is a simplified functional block diagram of the contrast enhancement block of FIG. 2, the contrast enhancement comprising an equalized lookup table construction block and an enhanced luminance image generation block.

Turning to FIG. 5, the contrast enhancement module or block 38 preferably includes a sample area selection module or block 52, an equalized lookup table construction module or block 54, and an enhanced luminance generation module or block 56. As used herein, and as will be appreciated by those having ordinary skill in the art after reading this specification, the phrases "lookup table" and "equalized lookup table" both refer to a lookup table derived from grey-level values or a lookup table representative of the inversion of the cumulative distribution function derived from an accumulated histogram.

In one embodiment, the sample area selection module or block 52 receives the conditioned luminance image signal 53 provided by the image pre-contrast conditioner 36 (FIGS. 2 and 3) and a selected portion of the input image, via input 57, to be enhanced. In response to the conditioned luminance input signal 53 and the image portion selection 57, the sample area selection module provides a selected conditioned luminance image signal 59 comprising conditioned luminance pixel data from the pixels within the selected region.

Depending upon the overall embodiment of a system, the selected portion of the image can be selected in a conventional manner such as by using a point-and-click interface (e.g., a mouse) to select a rectangular sub-image of an image displayed on a monitor (not shown). Alternatively, the selected portion of the image can be selected by automated means such as by a computer, based upon movement detection, with a portion of the image or other criteria.

In one embodiment, the equalized look-up table construction module or block 54 receives the selected conditioned image signal 59 from the sample area selection module or block 52 and, in response thereto, provides for creating a lookup table 61 that is used in generating the enhanced image signal 55 (i.e., transformed pixel frame data). As previously indicated, the selected conditioned luminance signal 59 received from the sample area selection module or block 52 can be a sub-image comprising a portion of the overall conditioned luminance image signal 53 received from the image pre-contrast conditioner 36 (FIGS. 2 and 3). Alternatively, the selected conditioned luminance signal 59 can consist of the complete conditioned luminance signal 53, without any apportioning by the sample area selection module 52.

Figure 6:
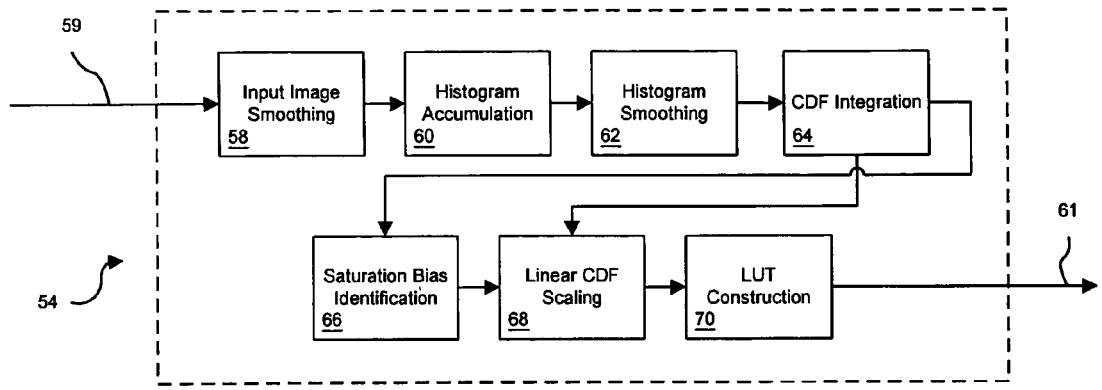
FIG. 6 is a simplified functional block diagram of the equalized lookup table construction block of FIG. 5.

As shown in FIG. 6, the equalized lookup table construction module, or block 54 of FIG. 5, includes an input smoothing module or block 58, a histogram accumulation module or block 60, a histogram smoothing module or block 62, a cumulative distribution function integration module or block 64, a saturation bias removal module or block 66, a linear cumulative distribution function scaling module or block 68, and a lookup table construction module or block 70.

In one embodiment, the input image smoothing module, or block 58, receives the selected conditioned luminance image signal 59 and, in response thereto, generates a smoothed conditioned luminance image signal on a frame-by-frame basis. Preferably, the input image smoothing module or block 58 applies a Gaussian filter with a traditional 3×3 kernel to the selected signal 59 for smoothing the image within each frame. As recognized by those having skill in the art, the Gaussian filter performs a weighted sum (center pixel=highest weight), wherein the result is normalized by the total kernel weight.

In one embodiment, a histogram accumulation module, or block 60, provides for generating a histogram of the selected conditioned image signal 59, as modified by the input image smoothing module. The histogram accumulation module, or block 60, accumulates a conventional histogram from the received input. Accordingly, the histogram can be used to provide a graph of luminance levels to the number of pixels at each luminance level. Stated another way, the histogram reflects the relationship between luminance levels and the number of pixels at each luminance level.

Accordingly, the histogram accumulation module or block 60 includes a plurality of data storage locations or "bins" for tracking the number of occurrences of each grey-level occurring in the received input signal, for example, such as that received by block 58. Preferably, the histogram accumulation module or block 60 includes a bin for every discrete grey-level in the input signal. As stated previously, for each grey-level in the input signal, the histogram accumulation module or block 60 determines the number of pixels in the input luminance image with the corresponding grey-level after being filtered, if desired. Accordingly, the histogram result for any given grey-level k is the number of pixels in the luminance image input having that grey-level.

In one embodiment, the histogram smoothing module or block 62 provides for reducing noise in the histogram created from the input image. The histogram smoothing module, or block 62, receives the histogram from the histogram accumulation, module or block 60, and in response thereto, generates a smoothed histogram. Preferably, the histogram smoothing module or block 62 applies a 5-point symmetric kernel (FIG. 4(*f*)) to filter the histogram calculated for each frame.

In one embodiment, the cumulative distribution function integration module or block 64 provides for integrating the histogram to create a cumulative distribution function. The cumulative distribution function integration module or block 64 receives the histogram from the histogram smoothing module 62, or optionally from the histogram accumulation module 60. The cumulative distribution function integration module 64 integrates the received histogram to generate a cumulative distribution function. It has been observed that integrating a smoothed histogram can result in a cumulative distribution function having an increased accuracy over a cumulative distribution function resulting from an unsmoothed histogram.

The cumulative distribution function integration module or block 64 includes a plurality of data storage locations or "bins" which hold the cumulative distribution function result for each input grey-level. Preferably, the cumulative distribution function integration module, or block 64, includes a bin for every discrete grey-level in the image resolution input range. For each grey-level in the image resolution input range, the cumulative distribution function integration module or block 64 determines the cumulative distribution function result and stores that result in the bin corresponding to that grey-level. For each grey-level k, the cumulative distribution function result is the sum of the histogram value for grey-level k and the cumulative distribution function result for the previous grey-level k−1. Accordingly, the following equation describes the cumulative distribution function result for a given grey-level k:

$$CDF(k)=H(k)+CDF(k-1)$$

where CDF(k) is the cumulative distribution function result for grey-level k, H(k) is the histogram value for grey-level k, and CDF(k−1) is the cumulative distribution function result for the grey-level one increment lower than grey-level k.

The saturation bias identification module, or block 66, provides for identifying the grey-levels that bound the useful information in the luminance signal 43. In one embodiment, the saturation bias identification module 66 receives the cumulative distribution function from the cumulative distribution function integration module 64 and determines the grey-levels at which the first unsaturated grey-level, $k_f$, and the last unsaturated grey-level, $k_1$, occurs. The first unsaturated grey-level, $k_f$, is determined by identifying the first grey-level $k_0$ for which the cumulative distribution function returns a non-zero value. The grey-level $k_0$ is treated as saturated, and the saturation bias identification module 66 identifies $k_f$ as the sum of $k_0$ plus one additional grey-level. The last unsaturated grey-level, $k_1$, is determined by identifying the first grey-level $k_n$ for which the cumulative distribution function returns the number of pixels in the image. The grey-level $k_n$ is treated as saturated, and the saturation bias identification module or block 66 identifies $k_1$ as the difference between $k_n$ minus one additional grey-level.

Accordingly, the useful grey-levels identified by the saturation bias identification module 66 is the range from, and including, $k_0$ plus one additional grey-level through $k_n$ minus one additional grey-level. In another embodiment, the useful grey-levels identified by the saturation bias identification module 66 is the range from, and including, $k_0$ through $k_n$ minus one additional grey-level. In yet another embodiment, the useful grey-levels identified by the saturation bias identification module 66 is the range from, and including $k_0$ plus one additional grey-level through $k_n$. In a further embodiment, the useful grey-levels identified by the saturation bias identification module 66 is the range from, and including, $k_0$ plus X additional grey-level(s) through $k_n$ minus Y additional grey-level(s), wherein X and Y are whole numbers greater than zero.

The linear cumulative distribution function scaling module or block 68 provides for scaling the portion of the cumulative distribution function corresponding to the unsaturated, useful grey-levels in the luminance input image across the entire range of cumulative distribution function grey-level inputs. In a preferred embodiment, the linear cumulative distribution function scaling module 68 receives the cumulative distribution function, provided by the cumulative distribution function integration module 64, and the first unsaturated grey-level $k_f$ and the last unsaturated grey-level $k_1$ from the saturation bias identification module 66.

The linear cumulative distribution function scaling module 68 includes a plurality of data storage locations or "bins" equal to the number of bins in the cumulative distribution function for holding the linearly mapped cumulative distribution function result for each input grey-level. In a preferred embodiment, the cumulative distribution function scaling module 68 scales the portion of the cumulative distribution function between $k_f$ and $k_1$ inclusively across the entire range of the linearly scaled cumulative distribution function. Accordingly, for each grey-level k in the input range, the linearly scaled cumulative distribution function output value LCDF(k) is determined by the following equation:

$$LCDF(k)=(CDF(k)-CDF(kf))/(CDF(Kl)-CDF(Kf))$$

where CDF(k) is the cumulative distribution function result for grey-level k, CDF(kf) is the cumulative distribution function result for kf, and CDF(kl) is the cumulative distribution function result for kl. Each linearly mapped cumulative distribution function result is stored in the bin corresponding to the current grey-level k. If LCDF(k) is negative for any input grey-level k, the linearly scaled cumulative distribution function result in the bin corresponding to the input grey-level k is set to zero.

The determination of the cumulative distribution function output value can be calculated using known methodologies for improving computation ease. For instance, the numerator can be scaled by a multiplier, before the division operation, to obtain proper integer representation. The result of the division can then be inversely scaled by the same multiplier to produce the LCDF(k) value. Preferably, the scale factor is an adequately large constant, such as the number of pixels in the input image.

In one embodiment, the lookup table construction module or block 70 generates a lookup table 61 that is used by the enhanced luminance image generation module (FIG. 5) to produce the enhanced luminance image signal 55. The lookup table construction module 70 receives the linearly scaled cumulative distribution function from the linear cumulative distribution function scaling module 70. In response to the scaled cumulative distribution function, the lookup table construction module 70 provides the lookup table 61.

Preferably, the lookup table 61 is constructed by multiplying each linearly scaled cumulative distribution function result by the number of discrete grey-levels in the output image resolution range which can be provided by the DIP switch 29 (FIG. 1), software, or other desired means. If the multiplication result is greater than the maximum value in the output image resolution range for any input grey-level, the linearly scaled cumulative distribution function result for that input grey-level is set to the maximum value in the output image resolution range. Accordingly, for each grey-level input in the linearly scaled cumulative distribution function, the result is a value in the output image resolution range.

Turning back to FIG. 5, the enhanced luminance image generation module, or block 56, is responsive to the lookup table 61 and the conditioned luminance signal 53. The luminance of each pixel within each input frame can be reassigned a different value based upon the lookup table corresponding to the same frame. Stated another way, the luminance value for each pixel in the conditioned luminance input image is used as an index in the look-up table, and the value at that index location is used as the luminance value for the corresponding pixel in the enhanced luminance output image. The reassigned frame data is then forwarded, preferably to image post contrast conditioner 40, as the enhanced image signal 55.

As shown in FIG. 2, the image post contrast conditioner 40 provides for filtering the enhanced image signal 55 to generate an enhanced conditioned image signal 72. The conditioner 40 can apply to the image signal 55 one or more conventional imaging filters, including an averaging filter, a Gaussian filter, a median filter, a Laplace filter, a sharpen filter, a Sobel filter, and a Prewitt filter.

The color inverse transform 42 generates the contrast enhanced digital video output signal 31, having an expanded range, in response to the enhanced image signal 72 and the color information for the same frame. The enhanced image signal and color information are combined in a conventional manner wherein luminance is combined with color information.

As will be appreciated by those having skill in the art, while the luminance of the input signal is being enhanced, the color information can be stored within memory 28, for example. Once the luminance has been enhanced, it can be re-combined with the color information stored in memory.

In response to the digital video output signal 31, the video encoder 23 preferably provides an analog output signal via output connector 16. The video encoder 23 preferably utilizes conventional circuitry for converting digital video signals into corresponding analog video signals.

Figure 7:
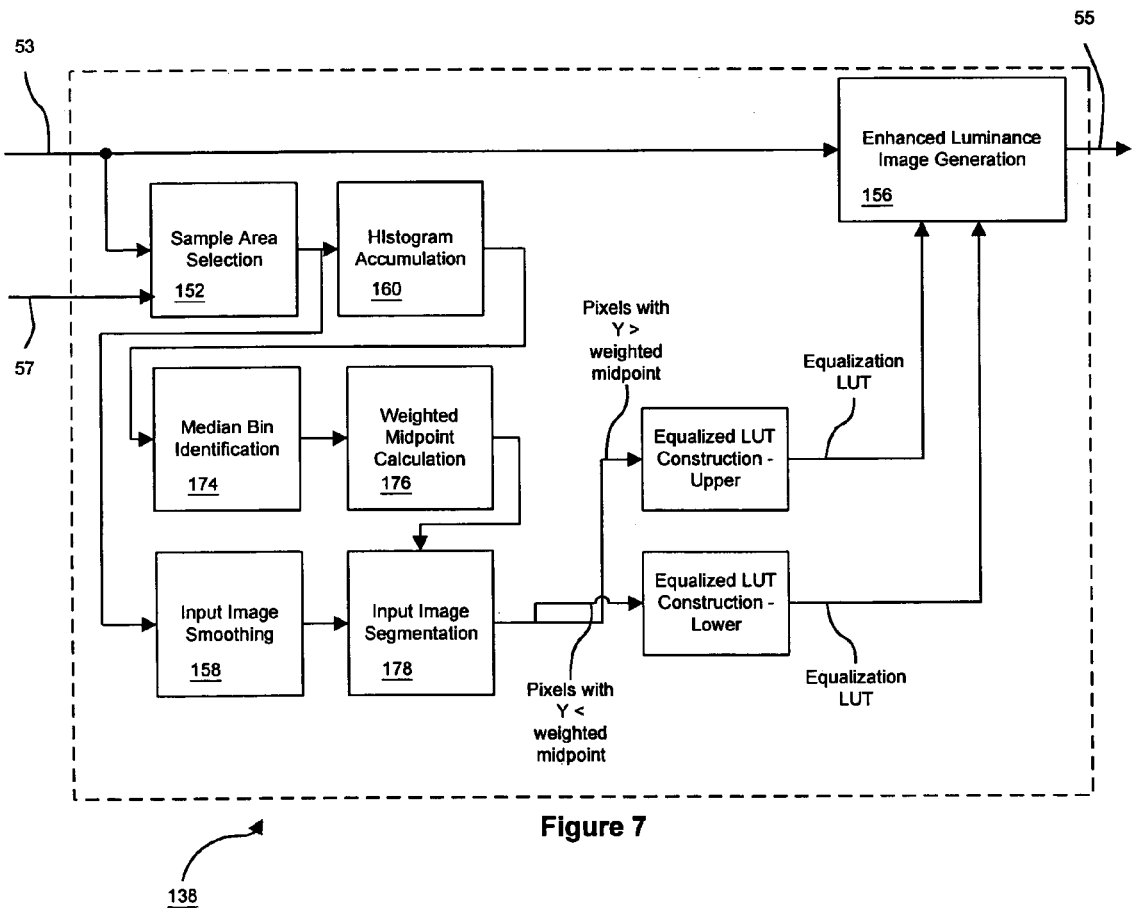
FIG. 7 is a simplified functional block diagram of another embodiment of the contrast enhancement block of FIG. 2; and, FIGS. 8 and 9 is a simplified function block diagram of yet another embodiment of the contrast enhancement block of FIG. 2.

Turning to FIG. 7, an alternate embodiment of the contrast enhancement module is depicted. Within FIG. 7, that last two digits of the reference numbers used therein correspond to like two digit reference numbers used for like elements in FIGS. 5 and 6. Accordingly, no further description of these elements is provided.

The median bin identification module or block 174 determines the median of the histogram provided by the histogram accumulation module 160. Next, the brightness midpoint value is calculated by the weighted midpoint calculation module or block 176. The brightness midpoint value preferably is calculated as the weighted sum of the actual grey-level midpoint of the input frame and the median of the input distribution. Preferably, the weights assigned to the grey-level midpoint and the median of the input distribution are configured as compile-time parameters.

The image segmentation module, or block 178, receives the luminance image data for the selected sample area, via module 152, and provides for segmenting the luminance image data into light and dark regimes and performing enhancement operations separately (i.e., luminance redistribution) on each of the regimes. Stated another way, the image segmentation module 178 assigns each pixel in the selected sample area to either the light or dark regime based on each pixel's relationship to the brightness midpoint value received from the midpoint calculation module 176. Pixels with a brightness value greater than the midpoint are assigned to the light regime, and pixels with a brightness value less than the midpoint value are assigned to the dark regime.

Pixel values assigned by the image segmentation module 178 are received by the lookup table construction modules, wherein enhanced lookup tables are constructed and forwarded to the enhanced luminance image generation module 156 for remapping of the conditioned luminance signal 53.

According to broad aspects of the invention, contrast enhancement is provided by heuristic and algorithmic techniques, including the calculation of the image grey-level histogram and sample cumulative distribution function. Preferably, maximum utilization of available grey-levels for representation of image detail is provided.

Entropy is a measure of the information content of the image. Entropy is generally the average number of bits required to represent a pixel of the image. Accordingly, a completely saturated image with only black and white can be represented by one-bit per pixel, on and off, thus, the image entropy is one-bit. A one bit image contains less information than an eight-bit image with 256 shades of grey.

According to broad aspects of the invention, optimized entropy is provided while maintaining a monotonic grey-level relationship wherein "monotonic" generally means that the precedence order of the input grey-levels are not changed by the desired grey-level transformation employed.

In one embodiment, contrast enhancement includes calculation of the sample cumulative distribution function of the image grey-levels. The inverted sample cumulative distribution is applied to map the input grey-levels. Because the inverted sample cumulative distribution function is used, the resulting transform approximates uniformly distributed grey levels within the input range. The uniform density histogram generally has the maximum entropy.

As known by those having skill in the art, classical "histogram equalization" directly applies the inverted sample cumulative distribution function to form the grey-level mapping lookup table. In an embodiment in accordance with the present invention, along with the inverted sample cumulative distribution data, it is preferred to combine a linear mapping to ensure full-range output, and also combine a saturation bias identification to improve grey-level uniformity in the presence of saturation. As will be appreciated by those having skill in the art, image saturation creates a pathology in the inverted sample cumulative distribution mapping that is not addressed in classical histogram equalization.

When the image is saturated the histogram has a pathology—an inordinate number of pixels are black or white or both. Direct calculation of the sample cumulative distribution function produces large gaps in endpoints of the grey-level transform. Such gaps mean that the maximum number of grey-level values are not being used, and the resulting output distribution does not closely approximate the desired uniform distribution. Moreover, the resulting image will contain broad areas of a single grey-level (for both black and with saturation). Sometimes, such areas are referred to as "puddles."

Figure 8:
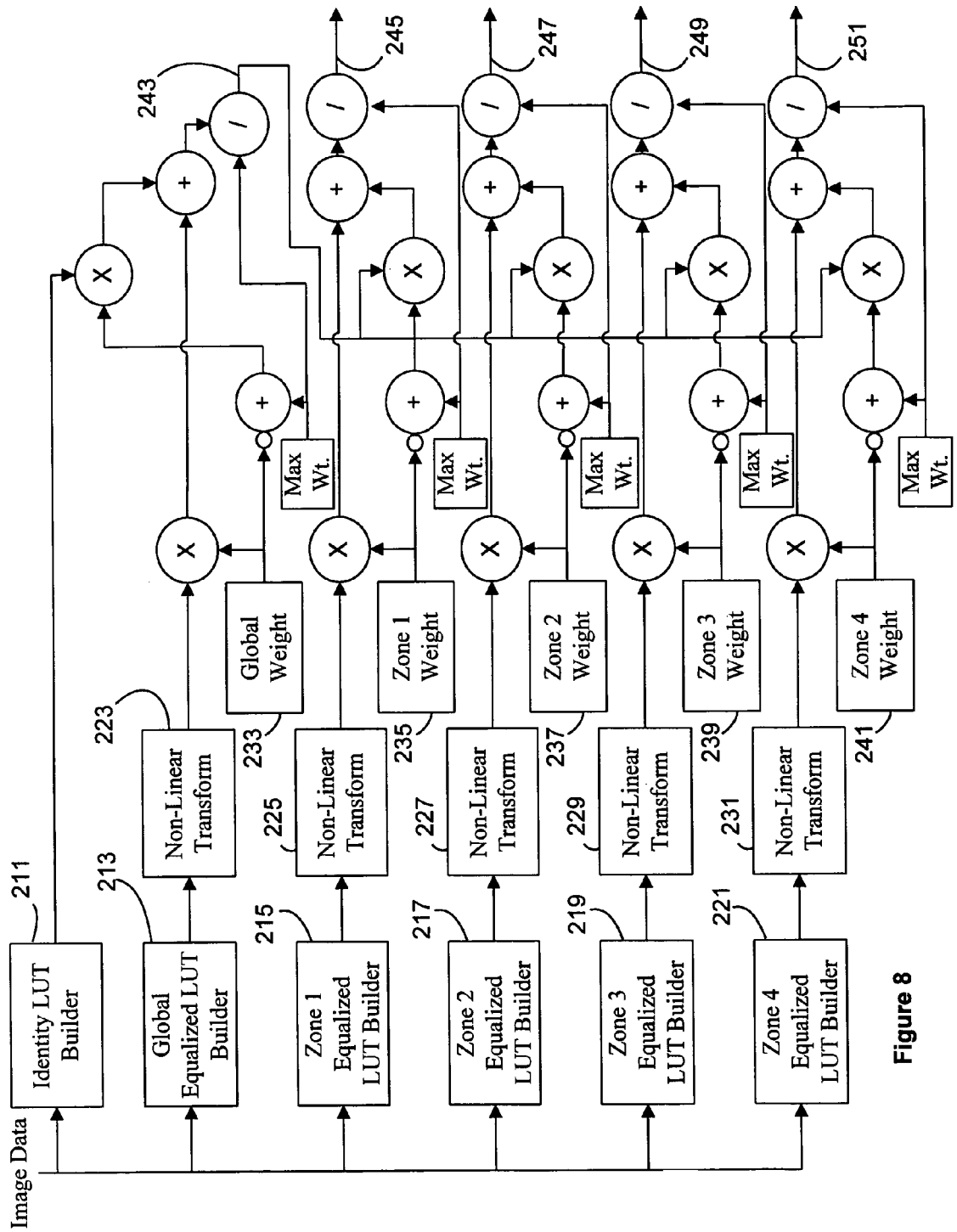
Figure 9:
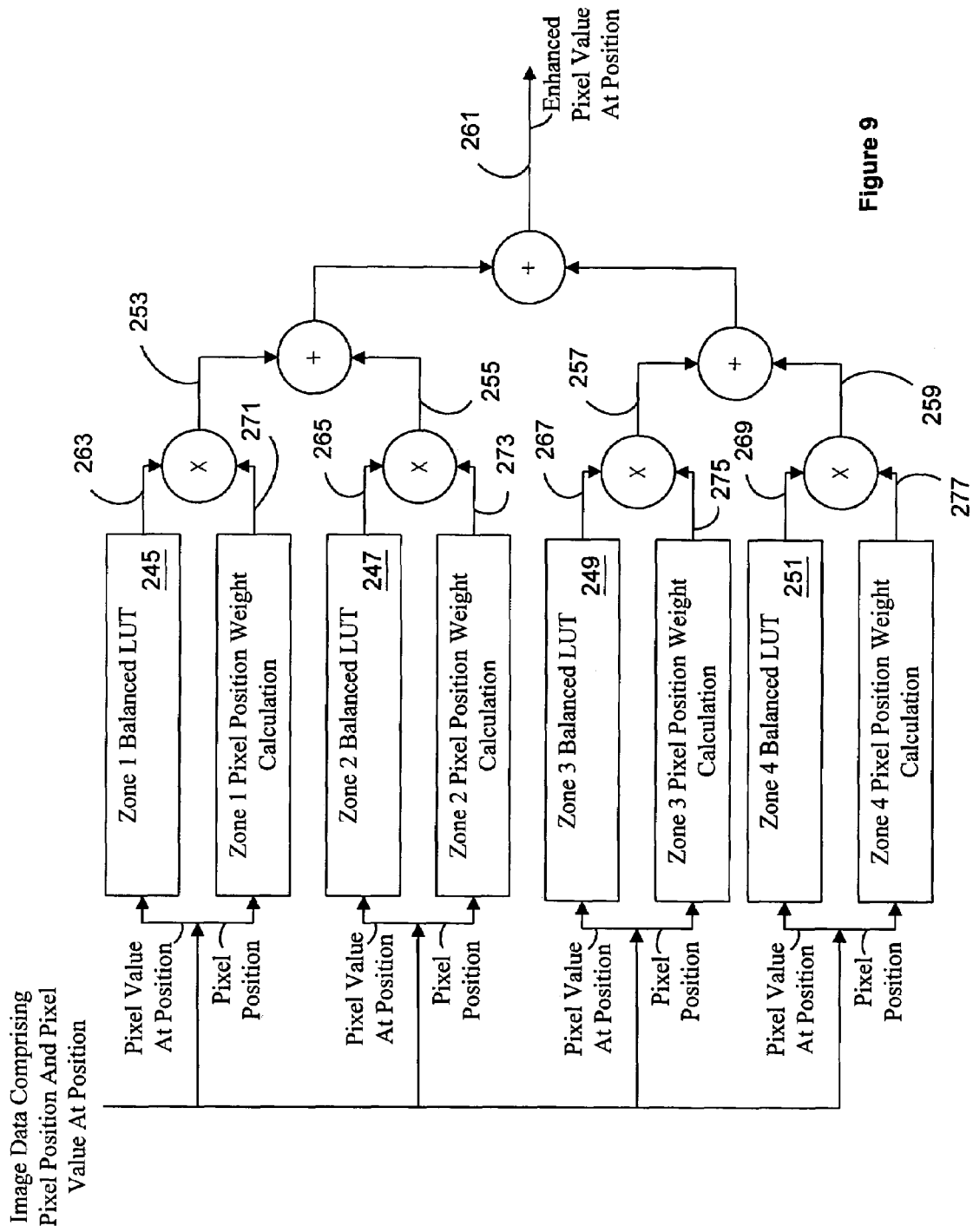

An embodiment of another broad aspect of the invention is disclosed in FIGS. 8 and 9 which are simplified functional block diagrams. The contrast enhancement block diagrams of FIGS. 8 and 9 include: an identity lookup table builder 211, a global equalized lookup table builder 213, a plurality of zone equalized lookup table builders 215, 217, 219 and 221; a plurality of non-linear transform blocks 223, 225, 227, 229 and 231; a global weight functional block 233; a plurality of zone weighting functional blocks 235, 237, 239 and 241; and a plurality of functional operators including adders, multipliers, and dividers.

The identity lookup table builder 211 constructs an identity lookup table for the image frame received. Thus, for each pixel having a contrast k, the lookup table output provided by block 211 provides the same contrast, k.

The global equalized lookup table builder 213 constructs a global equalized lookup table for the image data received. In particular, the functionality of the builder 213 within FIG. 8 is like that of block 54 within FIG. 6. Accordingly, a range of useful grey-levels is identified. As described above, the range can include all grey-levels within a cumulative distribution function or any lesser or greater amount as desired, for example all grey levels except for the first and/or last unsaturated grey-level within the distribution function. The range is then scaled to include an extended range of grey-levels including, but not limited to, the full range of grey-levels. The builder 213 provides, as an output, the scaled range as a lookup table to the non-linear transform 223.

Similar to the global equalized lookup table builder 213, each of the zone equalized lookup table builders 215, 217, 219 and 221, constructs an equalized lookup table for that portion of the image data within the particular table builder's zone. In particular, within each zone, a range of useful grey-levels is identified by the builder assigned to the zone. The range for each zone can include all grey-levels within a cumulative distribution function, except the first and/or last unsaturated grey-level within the zone's distribution function, or the like. The range is then scaled to include an extended range of grey-levels including, but not limited to, the full range of grey-levels. The lookup table builder for each zone then provides, as an output, its scaled range as a lookup table to a non-linear transform 223, 225, 227, 229 and 231.

FIG. 8 discloses schematically, that the non-linear transforms 223, 225, 227, 229 and 231, provide for weighting grey-level values towards white, thus brightening the image. In an embodiment, the non-linear transforms are a power function wherein the input to the non-linear transform for each pixel is normalized over the range of grey level values. For example, if there are 256 grey-level values available for each pixel, then the input for each pixel is normalized for 256 grey-level values. Then, a power is applied wherein the power is preferably a real number in the range of about 0 to about 1, and preferably 8. Therefore, the output of each non-linear transform 223, 225, 227, 229 and 231, is a lookup table (no reference number) where the values are skewed towards brightening the image.

The output of each non-linear transform 221-231 is multiplied by a weight as shown by blocks 233-241 of FIG. 8. Accordingly, the weighting provided by global weight 233 determines the balance between combining together two or more inputs. In particular, the global weight determines the balance between the identity lookup table and the transformed global equalized lookup table. The combination or blending together of the identity lookup table 211 and the transformed global equalized lookup table 213 results in a contrast enhanced global lookup table 243.

Likewise, the weighting provided by weights 235-241 determines the balance between the contrast enhanced global lookup table 243 and each transformed zone equalized lookup table. These combinations or blends result in a plurality of zonal balanced lookup tables 245-251 wherein the balanced lookup tables are contrast enhanced and relate, in part, to a particular zone of the original input image.

Turning to FIG. 9, the outputs from the zonal balanced lookup tables 245, 247, 249 and 251 of FIG. 8, are combined with corresponding pixel position weights for determining relative zonal pixel grey-levels 253, 255, 257 and 259. The relative zonal pixel grey-levels 253, 255, 257 and 259, are summed together to provide a final or composite enhanced pixel grey-level value 261 for each pixel.

In particular, the image data input provided to each lookup table 245, 247, 249 and 251 includes the original grey-level for each pixel within the image frame. Stated another way, each lookup table 245, 247, 249 and 251 receives the original grey-level image data input for each pixel within the image frame.

The outputs 263, 265, 267 and 269 of the lookup tables 245, 247, 249 and 251 provide new grey-level values for each pixel within the corresponding zone. This new grey-level values can be increased, decrease, or the same as the original luminance.

The outputs 263, 265, 267 and 269, of the lookup tables are multiplied by a corresponding position weighting factor 271, 273, 275 and 277. In particular, the new grey-level values for each pixel is multiplied by a weighting factor 271, 273, 275 and 277, based upon the pixel's location relative to one or more reference positions within the image frame. As will be appreciated by those having ordinary skill in the art, the weighting factors 271, 273, 275 and 277, govern how the grey-level within each zone effects the new grey-level values provided for each pixel within the image. Preferably, a pixel is effected more by pixel values within the zone within which it is located, and is effected less dramatically by pixel values from a zone furthest from the pixel. The weightings can be normalized so their total sum is 1.

In one embodiment, the reference positions within the image frame are located at the corners of the image frame. In a further embodiment, the reference positions can be at the centers of the defined zones.

The weightings are based upon the distance the pixel is located from the reference positions. For example, if the image frame is a square containing four equally sized zones with the reference positions at the corners of the image frame, then the weighting factors 271, 273, 275 and 277, for the center pixel within the image frame would be 0.25 because the pixel is equal distant from each zone's reference position (i.e., the corners of the image frame). Likewise, each pixel at the corners of the image frame would be weighted such that only the lookup table results for the zone containing the pixel would be applied in determining the pixel's new grey-level.

In yet another embodiment, and as will be appreciated by those having ordinary skill in the art, only a single zone can be used within an image frame. Preferably, the zone is centered in the image frame and is small in size than the entire image frame.

It should be understood that the device 10 and its combination of elements, and derivatives thereof, provide circuits and implement techniques that are highly efficient to implementation yet work very well. Others have proposed various forms of contrast enhancement solutions but the proposals are much more complex to implement. Apparatus and methods according to the invention create an algorithmically efficient procedure that results in cost efficient real-time implementation. This, in turn provides lower product costs.

While the specific embodiments have been illustrated and described, numerous modifications come to mind without significantly departing from the spirit of the invention and the scope of protection is only limited by the scope of the accompanying claims.

The invention claimed is:

1. An apparatus providing an image output signal in response to an image input signal, the device comprising:
    a saturation bias identification circuit having a range of useful grey-levels output responsive to the image input signal; and
    a cumulative distribution function scaling circuit having a scaled output responsive to the useful grey-levels output,
    wherein the range of useful grey-levels output includes all grey-levels within a cumulative distribution function except the first unsaturated grey-level within the cumulative distribution function and the last unsaturated grey-level within the cumulative distribution function.

2. The apparatus of claim 1 wherein the range of useful grey-levels output includes all grey-levels within a cumulative distribution function except the first unsaturated grey-level within the cumulative distribution function.

3. The apparatus of claim 1 wherein the range of useful grey-levels output includes all grey-levels within a cumulative distribution function except the last unsaturated grey-level within the cumulative distribution function.

4. The apparatus of claim 1 wherein the range of useful grey-levels output includes all grey-levels within a cumulative distribution function in the range from, and including, the first unsaturated grey-level ($k_0$) plus X additional grey-levels through the last unsaturated grey-level ($k_n$) minus Y additional grey-levels, wherein X and Y are whole numbers greater than zero.

5. The apparatus of claim 1 further comprising a video decoder having a digital output responsive to the image input signal, and wherein the range of useful grey-levels output is responsive to the digital output of the video decoder.

6. The apparatus of claim 1 further comprising a video encoder having an analog output responsive to the image input signal.

7. The apparatus of claim 1 further comprising a logical device containing the saturation bias identification circuit.

8. The apparatus of claim 7 wherein the logical device is a field programmable gate array.

9. The apparatus of claim 1 further comprising a color transform having a luminance output signal responsive to the image input signal.

10. The apparatus of claim 1 further comprising an image pre-contrast conditioner having a conditioned output responsive to the image input signal.

11. The apparatus of claim 10 wherein the image pre-contrast conditioner includes a median filter.

12. The apparatus of claim 10 wherein the image pre-contrast conditioner includes a Gaussian filter.

13. The apparatus of claim 10 wherein the image pre-contrast conditioner includes a Laplace filter.

14. The apparatus of claim 11 wherein the image pre-contrast conditioner includes another median filter.

15. The apparatus of claim 1 further comprising a sample area selection circuit having a selected image output signal responsive to the image input signal and an area selection input signal.

16. The apparatus of claim 1 further comprising a histogram accumulation circuit having a histogram output responsive to the image input signal.

17. The apparatus of claim 1 further comprising a cumulative distribution circuit having a cumulative distribution output responsive to the image input signal.

18. The apparatus of claim 1 further comprising a lookup construction circuit having a lookup table output responsive to the linear scaled output.

19. The apparatus of claim 18 further comprising an enhanced luminance image generation circuit having an enhanced image output responsive to the lookup table and the image input signal.

20. The apparatus of claim 1 further comprising a switch for selecting the range of useful grey-levels.

21. A method of providing an image output signal in response to an image input signal comprising the steps of:
generating a range of useful grey-levels in response to the image input signal; and
generating a scaled output in response to the range of useful grey-levels, wherein the step of generating a range of useful grey-levels includes specifying all grey-levels within a cumulative distribution function except the first unsaturated grey-level within the cumulative distribution function and the last unsaturated grey-level within the cumulative distribution function.

22. The method of claim 21 wherein the step of generating a range of useful grey-levels includes specifying all grey-levels within a cumulative distribution function except the first unsaturated grey-level within the cumulative distribution function.

23. The method of claim 21 wherein the step of generating a range of useful grey-levels includes specifying all grey-levels within a cumulative distribution function except the last unsaturated grey-level within the cumulative distribution function.

24. The method of claim 21 wherein the step of generating a range of useful grey-levels includes specifying all grey-levels within a cumulative distribution function in the range from, and including, the first unsaturated grey-level ($k_0$) plus X additional grey-levels through the last unsaturated grey-level ($k_n$) minus Y additional grey-levels, wherein X and Y are whole numbers greater than zero.

25. The method of claim 21 further comprising the step of generating a digital output responsive to the image input signal.

26. The method of claim 21 further comprising the step of generating an analog output in response to the image input signal.

27. The method of claim 21 further comprising the step of generating a luminance output signal in response to the image input signal.

28. The method of claim 21 further comprising the step of generating a conditioned output responsive to the image input signal.

29. The method of claim 28 wherein the step of generating a conditioned output includes the step of applying a median filter to a pixel array.

30. The method of claim 28 wherein the step of generating a conditioned output includes the step of applying a Gaussian filter to a pixel array.

31. The method of claim 28 wherein the step of generating a conditioned output includes the step of applying a Laplace filter to a pixel array.

32. The method of claim 29 further comprising the step of applying another median filter to a filtered pixel array.

33. The method of claim 29 further comprising the step of generating a selected image output signal in response to the image input signal and an area selection input signal.

34. The method of claim 29 further comprising the step of generating a histogram output in response to the image input signal.

35. The method of claim 29 further comprising the step of generating a cumulative distribution output in response to the image input signal.

36. The method of claim 29 further comprising the step of generating a lookup table in response to the linear scaled output.

37. The method of claim 29 further comprising the step of generating an enhanced image output in response to the lookup table and the image input signal.

38. The method of claim 21 further comprising the step of selecting the range of useful grey-levels.

* * * * *